United States Patent [19]

Okamoto et al.

[11] Patent Number: 5,504,927
[45] Date of Patent: Apr. 2, 1996

[54] SYSTEM FOR CONTROLLING INPUT/OUTPUT DATA FOR AN INTEGRATED ONE-CHIP MICROCOMPUTER UTILIZING AN EXTERNAL CLOCK OF A DIFFERENT SPEED FOR DATA TRANSFER

[75] Inventors: Minoru Okamoto, Matsubara; Mikio Sakakibara, Otsu, both of Japan

[73] Assignee: Matsushita Electric Industrial Co., Ltd., Osaka, Japan

[21] Appl. No.: 994,106

[22] Filed: Dec. 21, 1992

[30] Foreign Application Priority Data

Dec. 24, 1991 [JP] Japan ..................... 3-341013

[51] Int. Cl.$^6$ ........................... G06F 13/00; G06F 13/20; G06F 13/42
[52] U.S. Cl. .................. 395/878; 395/200.01; 395/550; 395/845; 327/145; 364/270.3; 364/270.6; 364/271.1
[58] Field of Search .................... 395/275, 200, 395/550, 821, 878, 200.01, 550

[56] References Cited

U.S. PATENT DOCUMENTS

| | | | |
|---|---|---|---|
| 4,435,761 | 3/1984 | Kimoto | 364/200 |
| 4,473,879 | 9/1984 | Tachiuchi et al. | 364/200 |
| 4,642,791 | 2/1987 | Mallozzi et al. | 364/900 |
| 4,761,735 | 8/1988 | Amy | 364/200 |
| 4,841,440 | 6/1989 | Yonezu et al. | 364/200 |
| 5,200,925 | 4/1993 | Morooka | 365/219 |

FOREIGN PATENT DOCUMENTS

| | | |
|---|---|---|
| 0258872 | 9/1987 | European Pat. Off. . |
| 60-107168 | 6/1985 | Japan . |
| 30081851 | 4/1991 | Japan . |
| 3228161 | 10/1991 | Japan . |

*Primary Examiner*—Thomas C. Lee
*Assistant Examiner*—Rehana Krick
*Attorney, Agent, or Firm*—Price, Gess & Ubell

[57] ABSTRACT

The present invention provides a data input/output control device integrating a one-chip microcomputer together with a data transfer device and a processor, the data transfer device being constructed to transmit to and receive from an external apparatus serial data and the processor processing data inputted to the data transfer device and transmitting the processed data to the data transfer device to be further transmitted to the external apparatus, the date input/output control device characterized in that a clock of the data input/output control device for an operation thereof is a transfer clock utilized by the external apparatus and the transfer clock is slower than a clock for the processor.

The data input/output control device comprises a controller for controlling the data input and the data output of the data transfer device, a flag holding unit for holding a flag which shows if the data have been inputted to the data transfer device by the processor or the external apparatus, a first synchronization circuit for synchronizing an output from the flag holding unit with the transfer clock, the output being sent to the controller, and a second synchronization circuit for synchronizing the output from the flag holding unit with the clock for the processor.

10 Claims, 8 Drawing Sheets

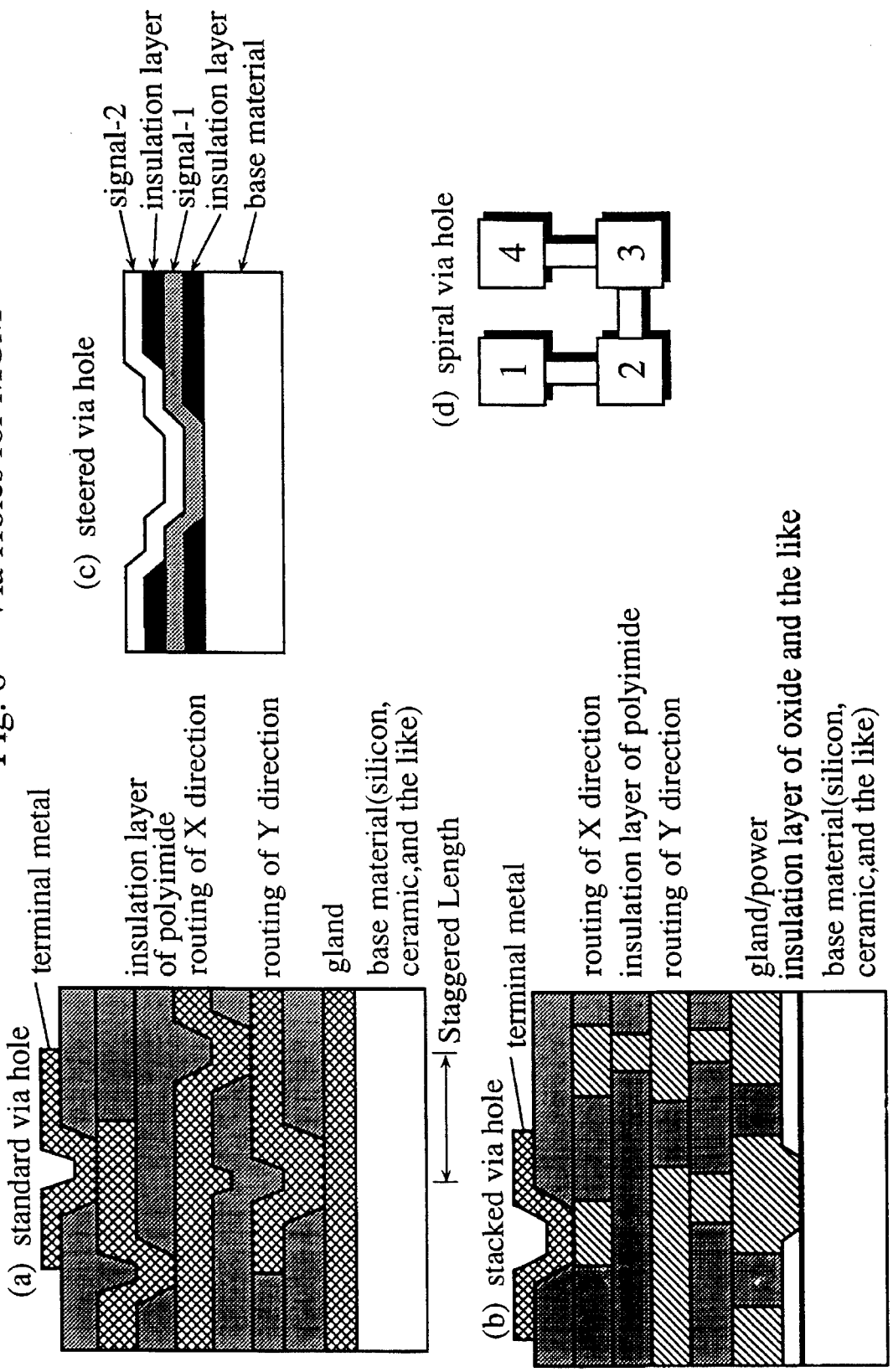
Fig. 8 Via Holes for MCM

SYSTEM FOR CONTROLLING INPUT/OUTPUT DATA FOR AN INTEGRATED ONE-CHIP MICROCOMPUTER UTILIZING AN EXTERNAL CLOCK OF A DIFFERENT SPEED FOR DATA TRANSFER

BACKGROUND OF THE INVENTION

1. Field of the Invention

This invention relates to a serial interface embedded in a one-chip LSI circuit together with a processor and, more particularly, to an improvement in a data input/output control device for a transfer of data between the processor and an external apparatus.

2. Description of the Related Art

Conventionally, the serial interface embedded in a one-chip LSI circuit together with the processor is operated at processor clock for the processor when the transfer of data is conducted between the processor and an external apparatus, such as by synchronizing a signal input to the serial interface (a data transfer clock and signals necessary for the transfer of the data from the external apparatus) with the processor clock.

The conventional serial interface is described hereunder with reference to FIGS. 1, 2, and 3.

Construction of a conventional serial interface, the processor and the external apparatus are shown in FIG. 1. The serial interface is equipped with structure to perform data input/output control and input/output data transfer. The input/output control is accomplished for all the units within the "data input/output device" dashed lines. The output buffer 530, shift register 540, and input buffer 550 perform input/output data transfer and are contained within the "data transfer device" dashed lines.

Data is transferred to and from an external apparatus 500. Transmission of a reception of the data is conducted between the external apparatus 500 and the embedded-type serial interface equipped with the devices labelled with numeral references above 500.

A transfer clock 501 is supplied from the external apparatus 500.

A transfer control signal 502 shows that the transfer of the data to the external apparatus is ready.

A processor 503 stores the data inputted from the external apparatus 500 or executes an operation.

A processor clock 504 is for an operation of the processor 503.

A controller 510 outputs control signals, which is synchronized with the processor clock 504.

A ready signal 511 is outputted from the controller 510 to show that the input or the output of the data is ready.

A synchronization means 521 synchronizes the transfer clock 501 with the processor clock 504, which is shown in a time chart of FIG. 2.

A synchronization means 522 synchronizes the transfer control signal 502 with the processor clock 504, which is shown in a time chart of FIG. 3.

A clock 523 is synchronized with the processor clock 504 by the synchronization means 521.

A signal 524 is outputted from the synchronization means 522.

An output buffer 530 holds the data of n bits (n is a positive integer) transferred from the processor 503 to the external apparatus 500.

A shift register 540 obtains the data of n bits outputted from the output buffer 530, which is synchronized with the clock 523 is accordance with a transmission data load signal outputted from the controller 510. The shift register 540 shifts the data in a direction of the most significant bit (MSB) by one bit at one time which is synchronized with the clock 523 in accordance with a shift clock signal.

One-bit data 541 located at the MSB of the shift register 540 are outputted to the external apparatus 500.

One-bit data 542 from the external apparatus 500 are inputted to the least significant bit (LSB) of the shift register 540.

An input buffer 550 obtains the data of n bits held in the shift register 540, which is synchronized with the processor clock 504 in accordance with the shift clock signal outputted from the controller 510.

A down counter 560 is set with an initial number m ($0<m\leq n$; m is an integer) for a start of a count down of the bits in the data to be inputted or outputted, and reduces m by one at a timing of the clock 523.

A flag circuit 570 with a flag showing status of the output buffer 530 and the input buffer 550 is set with a set signal 571 output from the controller 510 and is reset with a reset signal 572 outputted from the processor 503, the set signal 571 and the reset signal 572 being synchronized with the processor clock 504.

The serial interface constructed as described above is operated to output the data or input the data. The operations are described hereunder with reference to FIGS. 1, 2, and 3 (reference can also be made to "MN 19011, 1909 LSI Manual" by Matsushita Electronics corporation.

Data Out

The processor 503 writes in the output buffer 530 the data to be output to the external apparatus 500, and resets the flag circuit 570 with the reset signal 572 so that the controller 510 is in formed that data is held in the output buffer 530.

When a flag is reset, the controller 510 outputs the control signal 511, a binary 1 to inform the external apparatus 500 that output of the data is desired. Detecting the binary 1 control signal 511, the external apparatus 500 outputs the control signal 802 also a binary 1. Timing of the transfer control signal 502 is synchronized with the processor clock 504 by the synchronization means 522. The resulting synchronized signal is output as the signal 524. The signal 524 is then input to the controller 510.

When the signal 524 is 1, the controller 510 outputs a transmission data load signal so that the data in the output buffer 530 is transferred to the shift register 540. Simultaneously, the controller 520 outputs a load signal so that the initial number m is sent to the down counter 560. The first bit of data stream 541 is located at the MSB of the shift register 540 is transferred to the external apparatus 500. Simultaneously, the controller 510 sets the flag circuit 570 with the set signal 571.

The controller 510 looks at the signal 524. If the signal 524 is still a binary 1, the controller 510 outputs a shift clock signal so that the data in the shift register 540 is shifted in the direction of the MSB by one bit at a falling edge of the transfer clock 523. This second bit of data, formally located next to the MSB is output over data line 541. Simultaneously the controller 510 outputs a count clock signal so that a number m−1, obtained by reducing the initial number m by one, is held by,the down counter 560.

If the signal 524 is changed to a binary 0, the controller 510 does not output the shift clock signal so that the shift register 540 is not operated.

The above operations are repeated until (m+1)th data bit are outputted (until the down counter 560 counts 0).

When the above operations are conducted, the processor 503 refers to the flag circuit 570. If the flag circuit 570 is reset to show that data is in the output buffer 530, the processor 503 does not write data into the output buffer 530. If the flag circuit 570 is set, the processor 503 writes data in the output buffer 530 and resets the flag circuit 570. Hence, the processor 503 writes data into the output buffer 530 one bit at a time.

When the down counter count reaches 0, the controller 510 refers to the flag circuit 570. If the flag circuit 570 is reset to show that data is in the output buffer 530, the controller 510 outputs the transmission data load signal so that the data in the output buffer 530 is transferred to the shift register 540, and sets the flag circuit 570 with the set signal 571. Simultaneously, the controller 510 outputs the load signal so that the initial number m is set to the down counter 560. If the flag circuit 570 is set to show that no data is in the output buffer 530, the controller 510 outputs a binary 0 as the ready signal 511 so that the external apparatus 500 is informed that transfer of the data is completed.

Data In

The processor 503 reads the data in the input buffer 550 and then resets the flag circuit 570 with the reset signal 572 to show that no data is held in the input buffer 550.

Informed that the flag circuit 570 is reset the controller 510 outputs a binary 1 ready signal 511 to show that data may be transferred in. Detecting the binary 1 ready signal 511, the external apparatus 500 outputs a binary 1 transfer control signal 502. Timing of the transfer control signal 502 is synchronized with the processor clock 504 by the synchronization means 522, the result being output as the signal 524.

Detecting the binary 1 of signal 524, the controller 510 outputs a reception data load signal to the input buffer 550 so that the data in the shift register 540 (the data which has been inputted thereto) is copied. The first bit on data input 542 is output from the external apparatus 500 at a rising edge of the transfer clock 501. Simultaneously the controller 510 outputs the load signal so that the initial number m is set to the down counter.

The controller 510 refers to the signal 524. If the signal 524 is a binary 1, the controller 510 outputs the shift clock signal to the shift register 540 so that the data in the shift register 540 is shifted in the direction of the MSB by one bit, and the first bit on data input 542 is input to the LSB position of the shift register 540 at the rate of the clock 523. Simultaneously the controller outputs the count clock signal so that the number m−1 is held by the down counter 560, If the signal 524 is a binary 0, the controller 510 does not output the count clock signal so that the shift register 540 is not operated.

The operations described above are repeated until the (m+1)th data is input (the down counter 560 counts 0).

When the above operations are conducted, the processor 503 refers to the flag circuit 570. If the flag circuit 570 is reset to show that no data is in the input buffer 550, the processor 503 does not read any data therefrom, If the flag circuit 570 is set to show that data is held in the input buffer 50, the processor 503 reads the data and resets the flag circuit 570.

When the down counter 50 counts 0, the controller 510 refers to the flag circuit 570. If the flag circuit 570 is reset to show that the data in the input buffer 550 has been read, the controller 510 outputs the reception data load signal so that the data in the shift register 540 is transferred to the input buffer 550, and sets the flag circuit 570. Simultaneously the initial number m is set to the down counter 560.

If the flag circuit 570 is set to show that the data in the input buffer 550 has not been read by the processor 503, the controller 510 outputs a binary for 0 the ready signal 511 so that the external apparatus 500 is informed that the input of the data may not begin yet.

As is described hereinbefore the embedded-type serial interface synchronizes, at the input of the data, the data transfer clock and the signals necessary for the transfer of the data with the processor clock 504 for the processor 503. Such synchronization enables the serial interface to conduct the operations base on the processor clock 504 for the processor 503.

However, since all the units of the serial interface are synchronized with the processor clock 504 for the processor 503, a loss of electric power has been observed. That is, a commonly utilized processor clock frequency is several tens of Mega Hertz (MHz) and this is much higher than a frequency required for the input and the output of data, at several tens of kilo Hertz (kHz). It is commonly known that the higher the frequency required for the device, the more the electric power consumed. Particularly when a circuit is designed by utilizing a CMOS type transistor, the amount of electric power consumed by the circuit increases with an increase in the processor clock frequency.

OBJECTS AND SUMMARY OF THE INVENTION

It is a primary object of the present invention to provide a data input/output control device for a serial interface which eliminates the loss of electric power, caused by a difference between he processor clock frequency and the frequency required for data transfer, especially when the processor clock frequency is extremely high, such as when a one-chip microcomputer is utilized.

The above object is accomplished in a data input/output control device integrating a one-chip microcomputer with a data transfer device and a processor by utilizing a single clock, the data transfer clock, to time all the functions of the input/output control device which, in turn, controls the data transfer device. The data transfer device transmits and receives from an external apparatus by a serial data stream and transmits to and receives from the processor is parallel. The processor processes data input to the data transfer device and transmits the processed data to the data transfer device to be transmitted to the external apparatus. The data input/output control device utilizes the transfer clock of the external apparatus, even though the transfer clock is slower than the clock for the processor.

The loses of electric power which is caused by the difference between he processor clock frequency and the frequency required the prior art for the data input, and the data output is eliminated. Power dissipation required for the data transfer of the conventional data input/output control device can be reduced even when the processor clock frequency for the processor is extremely high, such as when a CMOS-type device is utilized. A certain amount of electricity is consumed depending upon the transfer speed, which varies depending on the kind of the external apparatus and a presence or absence of external apparatus. By constructing the data input/output control device of the present invention to consume different mounts of electricity in accordance with the transfer clock, energy efficiency is increased.

Alternate Forms of the Present Invention

The data input/output control device may comprise a controller for controlling the data input and the data output of the data transfer device, and a flag holding unit for holding a flag which shows if the data have been inputted to the data transfer device by one of the processor and the external apparatus.

The data input/output control device may further comprise a first synchronization circuit for synchronizing an output from the flag holding unit with the transfer clock, the output being sent to the controller, and a second synchronization circuit for synchronizing the output from the flag holding unit with the clock for the processor.

The data input/output control device, wherein the data transfer device may comprise a shift register for converting a transmission data from parallel into serial and a reception data from serial into parallel, a reception buffer for holding temporarily the data which have been stored in the shift register so that they are inputted to the processor, and a transmission buffer or holding temporarily the data outputted from the processor so that they are stored in the shift register, wherein the flag holding unit holds the flag which shows if the transmission buffer holds the data at a transmission of the data as well as shows if the reception buffer holds the data at a reception of the data.

The data input/output control device, wherein the controller may be constructed to control the shift register for transmitting to and receiving from the external apparatus the data, and characterized by at the transmission of the data, transferring the data in the transmission buffer to the shift register land outputting a shift clock to the shift register so that the serial data are transmitted if said flag shows that the transmission buffer holds the data while at the reception of the data, outputting the shift clock to the shift register in order to obtain the serial data outputted from the external apparatus, transferring the reception data in the shift register to the reception buffer, and changing the flag in the flag holding unit to show that the reception data are in the reception buffer.

The data input/output control device, wherein the controller may comprise a transmission control circuit for outputting a load signal so that the shift register is loaded with the transmission data when the flag shows that the transmission buffer holds the data at the transmission of the data, a shift clock output circuit for outputting the shift clock to the shift register when the shift register is loaded with the transmission data at the transmission of the data as well as outputting the shift clock to the shift register when a transfer ready signal is outputted from the external apparatus thereto at the reception of the data, and a reception control circuit for obtain the reception data from the shift register and changing the flag in the flag holding unit to show that the reception data are held therein.

The data input/output control device may further comprise a counter for counting the number of bits in the data to be transferred When the serial data are transferred therefrom to the external apparatus as well as the serial data are transferred from the external apparatus thereto.

The above object is also fulfilled by a data input/output control device integrating a one-chip microcomputer together with a data transfer device and a processor, the data transfer device being constructed to transmit to and receive from an external apparatus serial data and the processor processing data inputted to the data transfer device and transmitting the processed data to the data transfer device to be further transmitted to the external apparatus, the date input/output control device characterized by comprising a controller or controlling the data input and the data output of the data transfer device and a flag holding unit for holding a flag which shows if the data have been inputted to the data transfer device by one of the processor and the external apparatus.

The data input/output control device may further comprise a first synchronization circuit for synchronizing an output from the flag holding unit with the transfer clock, the output being sent to the controller, and a second synchronization circuit for synchronizing the output from the flag holding unit with the clock for the processor.

The data input/output control device, wherein the data transfer device may comprise shift register for converting a transmission data from parallel into serial and a reception data from serial into parallel, a reception buffer for holding temporarily the data which have been stored in the shift register so that they are inputted to the processor, and a transmission buffer from holding temporarily the data outputted from the processor so that they are stored in the shift register, wherein the flag holding unit holds the flag which shows if the transmission buffer holds the data at a transmission of the data as well as shows if the reception buffer holds the data at a reception of the data.

The data input/output control device, wherein the controller may be constructed to control the shift register for transmitting to and receiving from the external apparatus the data, and characterized by at the transmission of the data, transferring the data in the transmission buffer to the shift register rand outputting a shift clock to the shift register so that the serial data are transmitted if said flag shows that the transmission buffer holds the data while at the reception of the data, outputting the shift clock to the shift register in order to obtain the serial data outputted from the external apparatus, transferring the reception data in the shift register to the reception buffer, and changing the flag in the flag holding unit to show that the reception data are in the reception buffer.

The data input/output control device, wherein the controller may comprise a transmission control circuit for outputting a load signal so that the shift register is loaded with the transmission data when the flag shows that the transmission buffer holds he data at the transmission of the data, a shift clock output circuit for outputting the shift clock to the shift register when the shift register is loaded with the transmission data at he transmission of the data as well as outputting the shift clock to the shift register when a transfer ready signal is outputted from the external apparatus thereto at the reception of the data, and a reception control circuit for obtaining the reception data from the shift register and changing the flag in the flag holding unit to show that the reception data are held therein.

The data input/output control device may further comprise a counter for counting the number of bits in the data to be transferred when the serial data are transferred therefrom to the external apparatus as well as the serial data are transferred from the external apparatus thereto.

The above object is also fulfilled by a one-chip microcomputer comprising a data transfer device or serial data transmitted to and received from an external apparatus, a data input/output control device for controlling the data transfer device, and a processor for an input and an output of the data via the data transfer device, the one-chip microcomputer characterized by the data input/output control device utilizing a transfer clock as an action clock in order to control the input an the output of the data transfer device, the transfer clock generated by the external apparatus and being slower than the processor clock for the processor.

The data input/output control device may comprise a controller for controlling the data input and the data output of the data transfer device, and a flag holding unit for holding a flag which shows if the data have been inputted to the data transfer device by one of the processor and the external apparatus.

The data input/output control device may further comprise a first synchronization circuit for synchronizing an output from the flag holding unit with the transfer clock, the output being sent to the controller, and a second synchronization circuit for synchronizing the output from the flag holding unit with the clock for the processor.

The data input/output control device, wherein the data transfer device may comprise a shift register for converting a transmission data from parallel into serial and a reception data from serial into parallel, a reception buffer for holding temporarily the data which have been stored in the shift register so that they are inputted to the processor, and a transmission buffer for holding temporarily the data outputted from the processor so that they are stored in the shift register, wherein the flag holding unit holds the flag which shows if the transmission buffer holds the data at a transmission of the data as well as shows if the reception buffer holds the data at a reception of the data.

The data input/output control device wherein the controller may be constructed to control the shift register for transmitting to and receiving from the external apparatus the data, and characterized by at the transmission of the data, transferring the data in the transmission buffer to the shift register and outputting a shift clock to the shift register so that the serial data are transmitted if said flag shows that the transmission buffer holds the data while at the reception of the data, outputting the shift clock to the shift register in order to obtain the serial data outputted from the external apparatus, transferring the reception data in the shift register to the reception buffer, and changing the flag in the flag holding unit to show that the reception data are in the reception buffer.

The data input/output control device, wherein the controller may comprise a transmission control circuit for outputting a load signal so that the shift register is loaded with the transmission data when the flag shows that the transmission buffer holds the data at the transmission of the data, a shift clock output circuit for outputting the shift clock to the shift register when the shift register is loaded with the transmission data at the transmission of the data as well as outputting the shift clock to the shift register when a transfer ready signal is outputted from the external apparatus thereto at the reception of the data, and a reception control circuit for obtaining the reception data from the shift register and changing the flag in the flag holding unit to show that the reception data are held therein.

The data input/output control device may further comprise a counter for counting the number of bits in the data to be transferred when the serial data are transferred therefrom to the external apparatus as well as the serial data are transferred from the external apparatus thereto.

The data input/output control device constructed the above utilizes as a clock the transfer clock generated by the external apparatus in order to control the input and the output of the data transfer device, the transfer clock being slower than the processor clock for the processor.

BRIEF DESCRIPTION OF THE DRAWINGS

These and other objects, advantages and features of the invention will become apparent from the following detailed description when taken in conjunction with the accompanying drawings which illustrate the preferred embodiments of the invention. In the drawings:

FIG. 8 is a time chart of timing signals utilized for input of data in the embodiment of FIG. 4, according to the present invention.

DESCRIPTION OF THE PREFERRED EMBODIMENT

Figure 1:
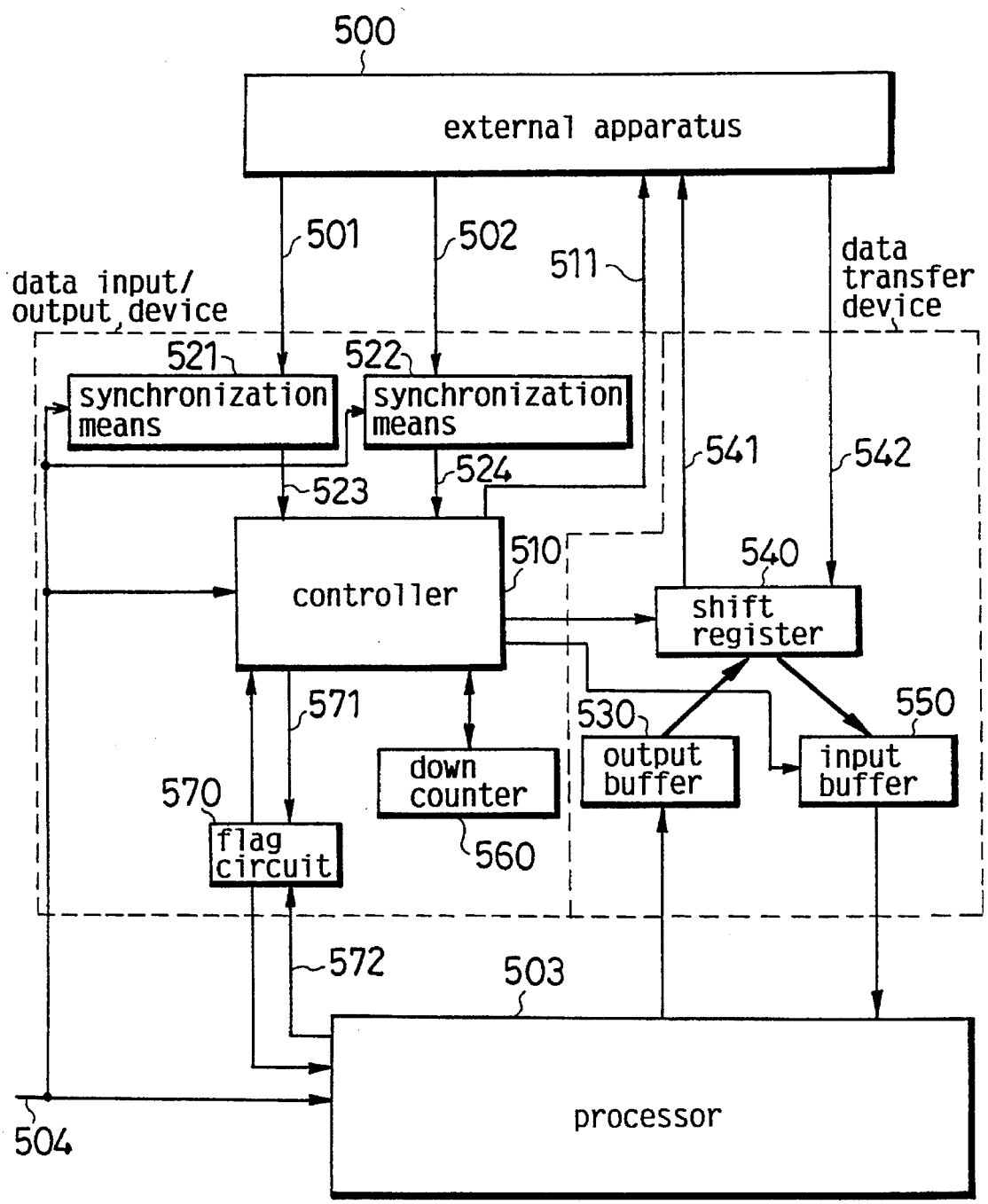
FIG. 1 is a block diagram illustration showing construction of a conventional serial interface, the processor, and the external apparatus.
Figure 2:
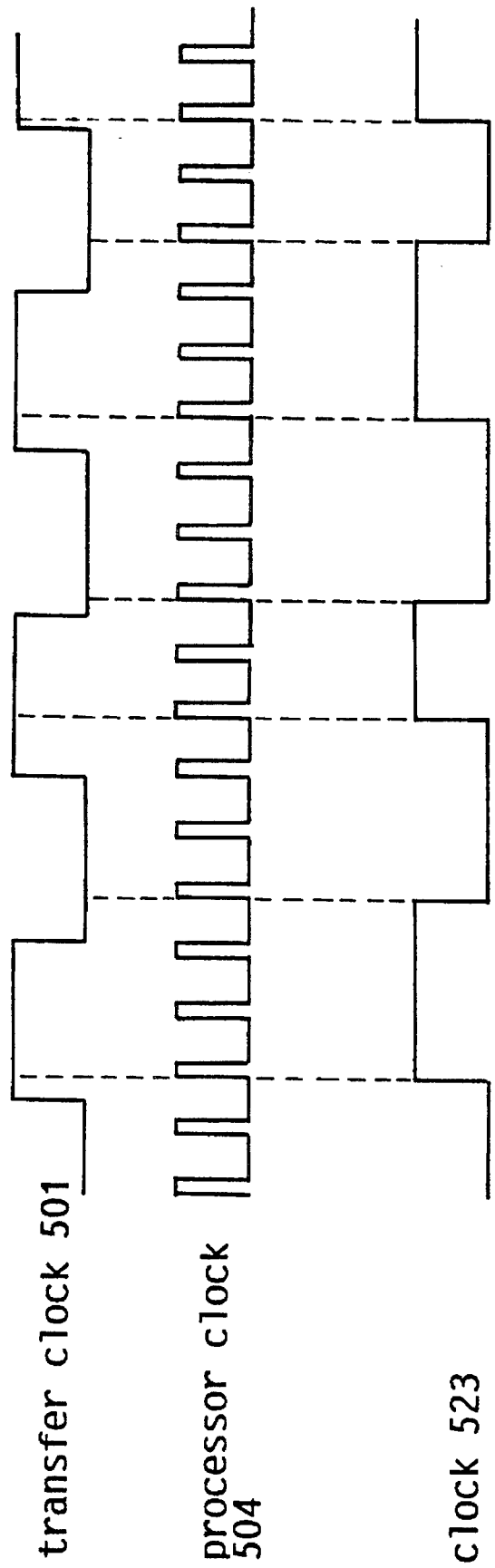
FIG. 2 is a time chart of the clocks utilized by the conventional data input/output device of FIG. 1.
Figure 3:
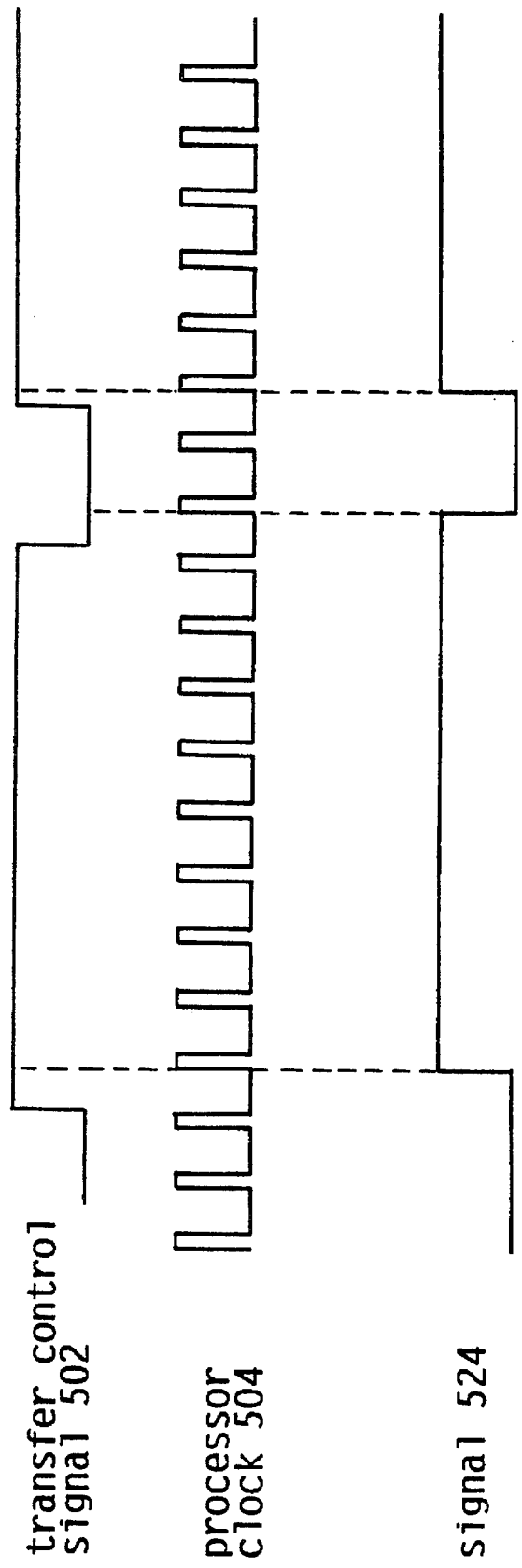
FIG. 3 is a time chart of the control signals utilized by the conventional data input/output device of FIG. 1.
Figure 4:
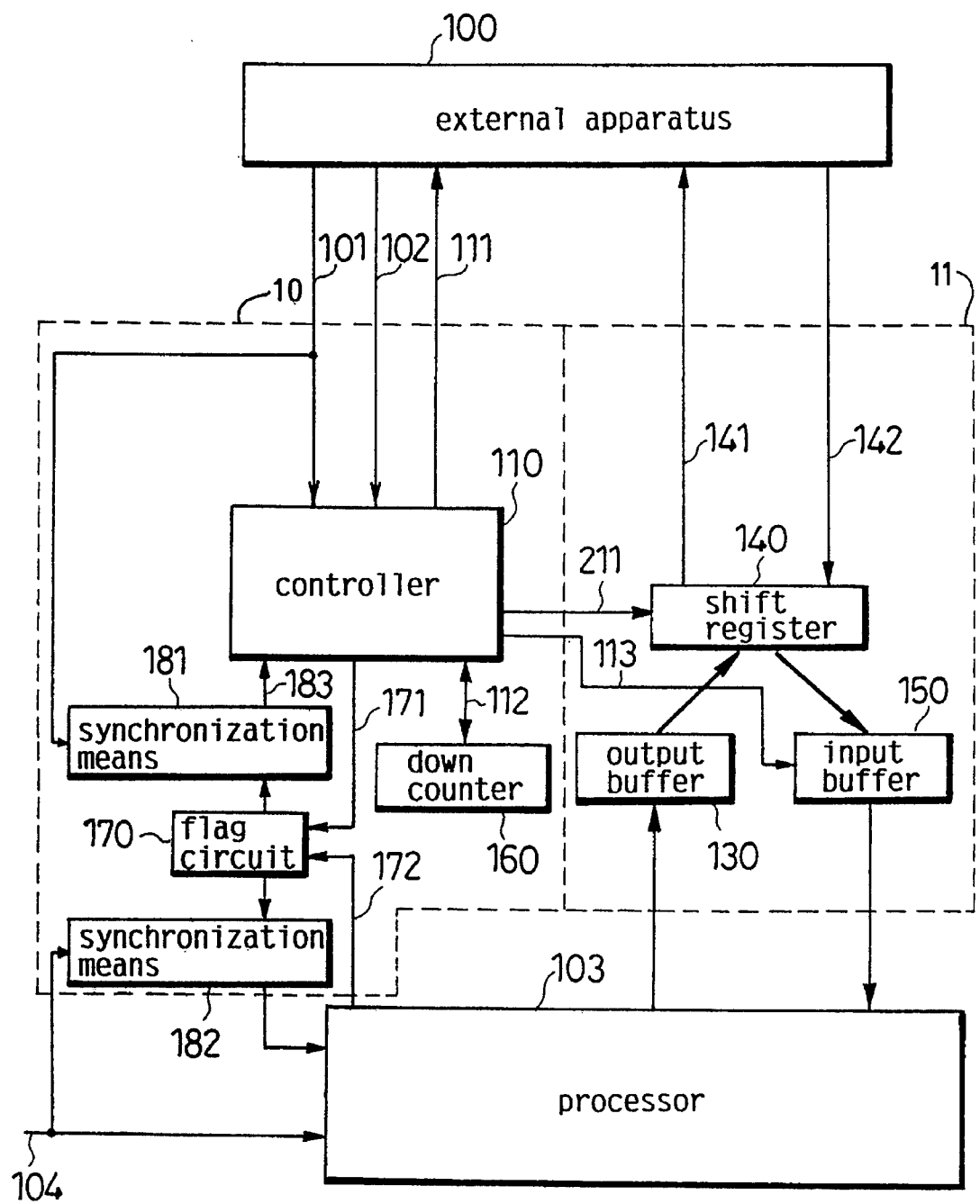
FIG. 4 is a block diagram illustration showing construction of a serial interface, the processor, and the external apparatus, according to a preferred embodiment of the present invention.

A construction of a serial interface, a processor and an external apparatus according to the present invention is shown in FIG. 4, as shown in the figure, the serial interface between the processor 103 and the external device is: a data input/output data control device 10 and a data transfer device 11. The input/output control device 10 includes all the units except the output buffer 130, shift register 140 and input buffer 150, which make up the data transfer device 11.

Data is received from or sent to an external apparatus 100, which could be a A/D converter, or other processors, for example.

A transfer clock signal 101 is supplied by the external apparatus 100 to the controller 110.

A transfer control signal 102 indicates that transfer of data to the external apparatus 102 is permitted.

A processor 13 reads the data in an input buffer 150, writes the data into an output buffer 130 refers to or resets a flag circuit 170, and executes other operations and processes.

A processor clock 104 is for an operation of the processor 103.

A controller 110 outputs control signals to control the embedded-type data input/output control device 10, which is synchronized with the transfer clock signal 101.

A ready signal 111 is outputted from the controller 110 to show that the input or the output of the data is ready.

An output buffer 130 holds the data of n bits (n is a positive integer, for example, 24) to be outputted from the processor 103 to the external apparatus 100.

A shift register 140 obtains the data of n bits outputted from the output buffer 130, which is synchronized with the transfer clock signal 101 in accordance with a transmission data load signal outputted from the controller 110. The shift register 140 shifts the data in the direction of the most significant bit (MSB), one bit at one time, in accordance with a shift clock signal 211, which is synchronized with the transfer clock signal 101.

Figure 5:
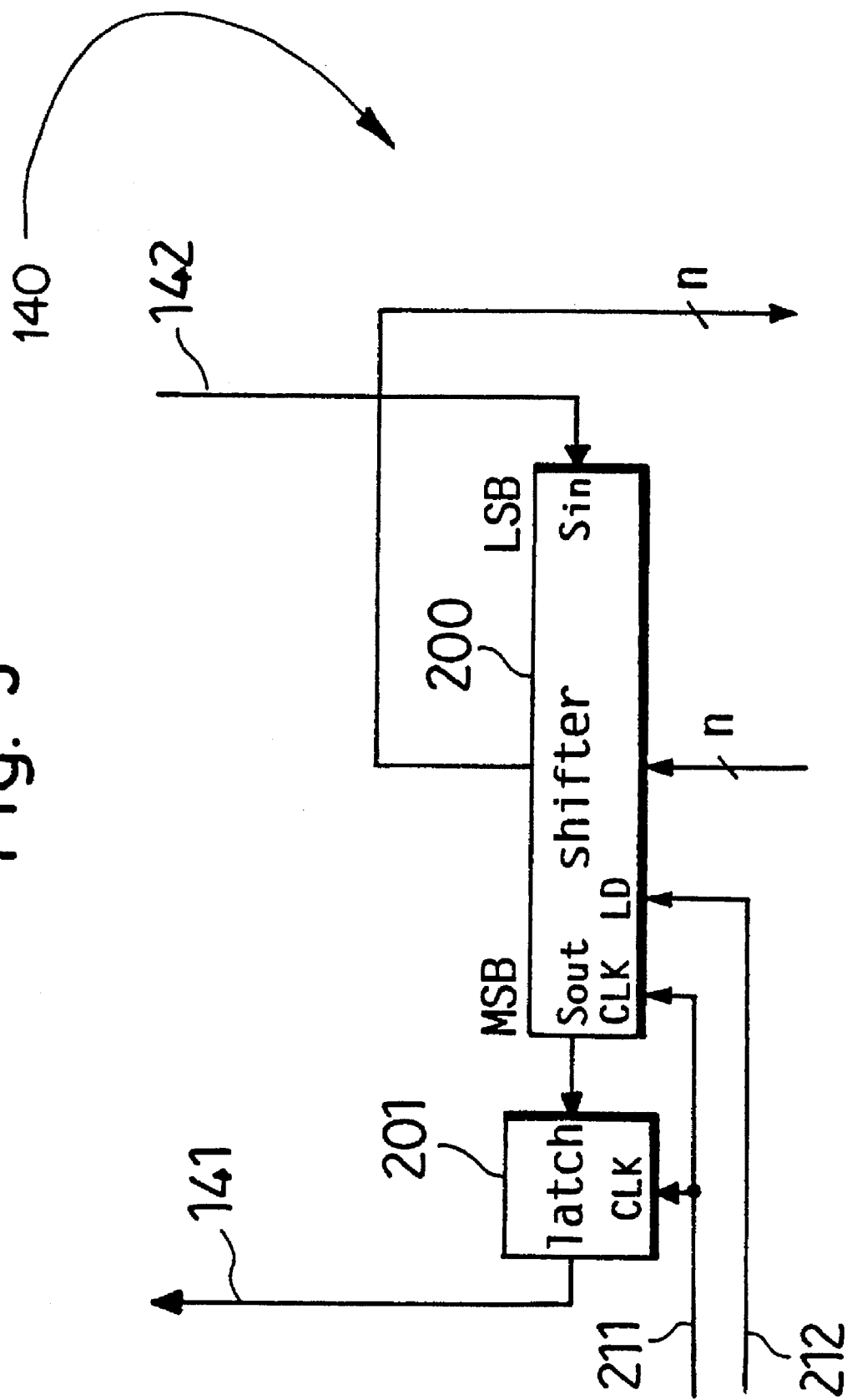
FIG. 5 is a block diagram illustration showing construction of a shift register utilized in the embodiment of FIG. 4.

A construction of the shift register 140 is described with reference to FIG. 5. As shown in the figure the shift register 140 comprises a shifter 200 and a latch circuit 201. The shifter 200 is loaded with parallel data from the output buffer 130 (FIG. 4) or serial data, one-bit at a time at a $S_{in}$ terminal (the least significant bit, LSB, side), when transmission data load signal 216 becomes active. The data is shifted in the direction of the MSB at a falling edge of the shift clock signal 211. The shifter outputs one-bit data located at the MSB from a $S_{out}$ terminal (the MSB side) to the latch 201. The latch circuit 201 latches the data shifted out by the shifter 200 and outputs the serial data on output line 141 to the external apparatus, at a rising edge of the shift clock signal 211. That is, transmission data is output from the latch circuit 201 at the rising edge of clock 211 while reception data from an external apparatus 100 in input to the shifter 200 at the falling edge. Furthermore, the shift register 140 shifts he transmission data output on line 141 at the rising edge Of the shift clock signal 211 and shifts the reception data on line 142 at the falling edge of shift clock signal 211.

A serial data stream, one-bit at a time, starting with the MSB of the shift register 140 are outputted over line 141 to the external apparatus 100.

A serial data stream, one-bit at a time, is transferred from the external apparatus 100 to the LSB position at $S_n$ of the shift register 140 over line 142.

An input buffer 150 (FIG. 4) obtains the data of n bits loaded into the shift register 140, in parallel in synchronism with the transfer clock signal 101 and the shift clock signal 211 outputted from the controller 110.

A down counter 160 (FIG. 4) is set with an initial number m ($0<m\leq n$; m is an integral number) at the start of a count down of the bits in the data, and reduces m by one in accordance with a count clock signal 112 outputted from the controller 110.

A flag circuit 170 is set with a flag set signal 171 from the controller 110 and is reset with a flag reset signal 172 from the processor 103. The flag set signal 171 is synchronized with the transfer clock signal 101. The flag reset signal 172 is synchronized with the processor clock 104.

A synchronization means 181 synchronizes timing of the flag circuit 170 with the transfer clock signal 101.

A synchronization means 182 synchronizes the timing of the flag circuit 170 with the processor clock 104.

A flag circuit 183 is output from the flag circuit 170 via the synchronization means 181.

Figure 6:
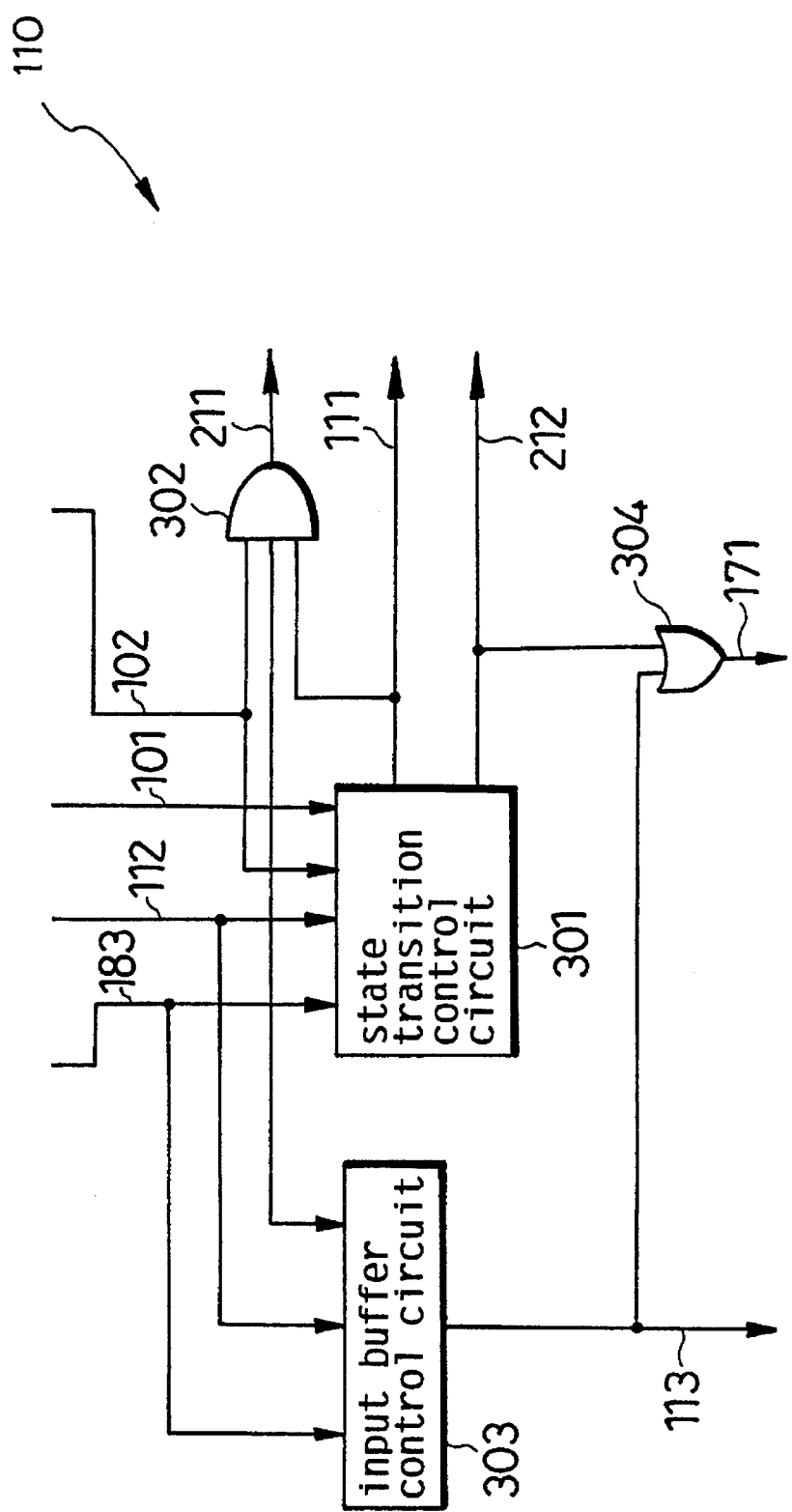
FIG. 6 is a block diagram illustration showing construction of a controller utilized in the embodiment of FIG. 4.

A construction of the controller 110 is described with reference to FIG. 6.

A terminal count signal 112 is outputted from the down counter 160 when it counts 0.

A reception data load signal 113 transfers the data in the shift register 140 to the input buffer 150.

A shift clock/count clock signal 211 orders a shift of the shift register 140 or a counting of the down counter 160.

A transmission data load/initial number load signal 212 orders a transfer of the data from the output buffer 130 to the shift register 140 or a load of the number to be counted down by the down counter 160.

A state transition control circuit 301 controls the data input/output control device 10 and the data transfer device 11 depending on the state of the data transferred between the device 11, the processor 103, and the external apparatus 100.

An AND circuit 302 outputs the transfer clock signal 101 as the shift clock/count clock signal 211 when the transfer control signal 102 and the ready signal 111 becomes active.

An input buffer control circuit 303 activates the transmission data load/initial number load signal 113 so that the input buffer 150 is loaded with the data in the shift register 140 when he flag signal 183 is 0 and the down counter 160 counts 0 at the reception of data, the activation being synchronized with the transfer clock signal 101.

The serial interface as described above is operated to output data or input data. The operations are described hereunder with reference to the drawings.

Data Out

The processor 103 writes in the output buffer 130 the data to be outputted to the external apparatus 100 and resets the flag circuit 170 with the flag reset signal 172 so that the controller 110 is informed that data is held in the output buffer 130. The output signal of the flag circuit 170 is synchronized with the transfer clock signal 101 by the synchronization means 181 which generates the flag signal 183. The flag signal 183 is then inputted to the state transition control circuit 301 in FIG. 6 and is sampled thereby at a falling edge of the transfer clock signal 101. Then the state transition control circuit 301 refers to the flag signal 183. If the flag signal 183 is 0, the state transition control circuit 301 outputs a binary 1 as the ready signal 111, so that the external apparatus 100 is informed that the transmission of the data is ready. Detecting the binary 1 ready signal 111, the external apparatus 100 outputs a binary as the transfer control signal 102 to show that the reception of the data is ready.

Figure 7:
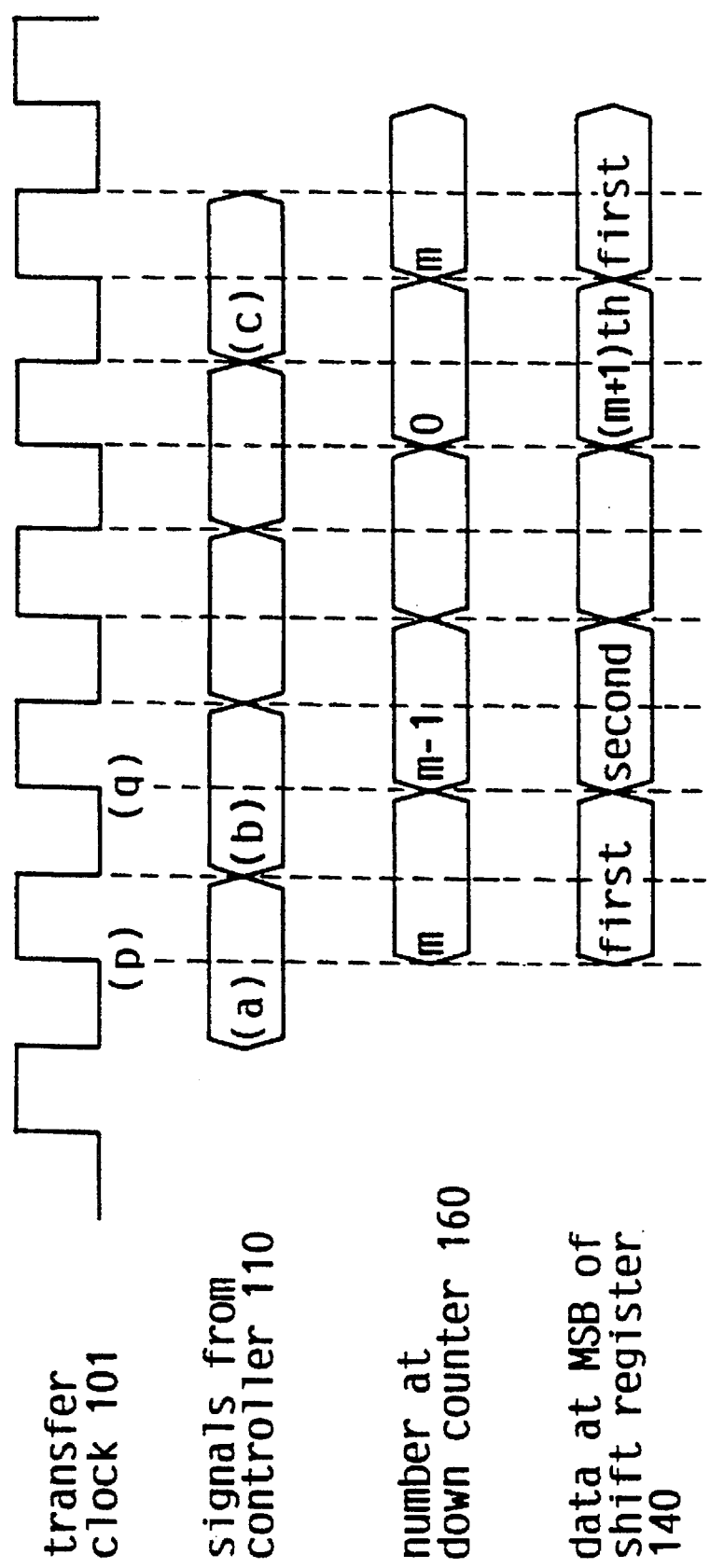
FIG. 7 is a time chart of timing signals utilized for output of data in the embodiment of FIG. 4, according to the present invention.

Detecting the binary 1 of the transfer control signal 102, the state transition control circuit 301 activates the transmission data load/initial number load signal 212. Directed by the signal 212, the data is transferred from the output buffer 130 to the shift register 140 at the rising edge of the transfer clock signal 101 shown by (p) in FIG. 7 (FIG. 7 is a reference for timing of output executions), and the first bit of data from shift register 140 is outputted over line 141 to the external apparatus 100. Simultaneously, the initial number of bits loaded into the shift register 140 is set to the down counter 160. The flag circuit 170 is set with the flag set signal 171 to show that the output buffer 130 is ready to receive new data.

The state transition control circuit 301 refers to the transfer control signal 102. If the transfer control signal 102 holds a binary 1, the state transition control circuit 301 outputs the shift clock/count clock signal 211, which is executed at (b) timing in the figure. Directed by the signal 211, the data in the shift register 140 is shifted in the direction of the MSB by one bit at the rising edge of the transfer clock signal 101, shown at (q) in the figure, and the second bit of data is outputted over line 141. Simultaneously a number m−1, obtained by reducing the initial number m by one, is held by the down counter 160. If the transfer control signal 102 is a binary 0, the state transition control circuit 301 does not output the shift clock/counter clock signal 211 so that the shift register 140 is not operated. The above operations are repeated until (m+1)th data are outputted (until the down counter 160 counts 0).

Inputted with the terminal count signal 112, the state transition control circuit 301 refers to the flag circuit 170. If the flag circuit 70 is reset to show that data is in the output buffer 130, the state transition control circuit 301 activates the transmission data load/initial number load signal 212 so that the data in the output buffer 130 is transferred to the shift register 140, and sets the flag circuit 170 with the flag set signal 171. Simultaneously the initial number m is set to the down counter 160. If the flag circuit 170 is set to show tat no data is in the output buffer 130, the state transition control circuit 301 outputs a binary for 0 the ready signal 111 so that the external apparatus is informed that the output of the data is completed, which is executed at (c) in the figure.

The processor 103 refers to a status of the flag circuit 170 via the synchronization means 182. If the flag circuit 170 is reset to show that data is in the output buffer 130, the processor 103 does not write any data into the output buffer 130. If the flag circuit 170 is set, the processor 103 writes data into the output buffer 130 and resets the flag circuit 170.

Data In

The processor 103 reads the data in the input buffer 150 and then resets the flag circuit 170 with the reset signal 172 outputted at the timing of the processor clock 104 to show that no data is held in the input buffer 150.

Informed via the synchronization means 181 that the flag circuit 170 is reset at the rising edge of the transfer clock signal 101, the state transition control circuit 301 outputs a binary 1 for the ready signal 111 to show that the data is ready to be inputted, which is executed at (a) timing in FIG. 8. (FIG. 8 is a reference for timing of input executions). Detecting the binary 1 ready signal 111, the external apparatus 100 outputs the first bit of data on line 142 at the rising edge of the transfer clock signal 101, and then outputs a binary 1 for the transfer control signal 102.

Detecting the binary 1 transfer control signal 102, the state transition control circuit 301 outputs the shift clock signal/count clock signal 211 and activates the transmission data load/number load signal 212, which is executed at (b) in FIG. 8. Directed by the signals 211 and 212, the data in the shift register 140 is shifted in the direction of the MSB by one bit at the falling edge of the transfer clock signal 101, which is shown by (p) in FIG. 8, and the first bit of data on line 142 is inputted to the LSB position of the shift register 140. Simultaneously the initial number m is set to the down counter 160 at the falling edge of the transfer clock signal 101, shown by (p) in the FIG. 8.

The state transition control circuit 301 refers to the transfer control signal 102. If the transfer control signal 102 holds a binary 1, the state transition control circuit 301 outputs the shift clock/count clock signal 211, which is executed at (c) in FIG. 8. Directed by the signal 211, the shift register 140 shifts the data in direction of the MSB by one bit at the falling edge of the transfer clock signal 101, shown by (q) in FIG. 8, and the down counter 10 holds the number m−1 at the falling edge of the transfer clock signal 101, shown by (q) in FIG. 8. If the transfer control signal 102 is a binary 0, the state transition control circuit 301 does not output the shift clock/count clock signal 211 so that the shift register 140 is not operated.

The operation described above is repeated until the (m+1)th data bit is inputted (the down counter 160 counts 0).

Inputted with the terminal count signal 112 at the rising edge of the transfer clock signal 101, the controller 110 refers to the status of the flag circuit 170. If the flag circuit 170 is reset to show that no data is in the input buffer 150, the controller 110 outputs the reception data load signal 3 so that the data in the shift register 140 is transferred to the input buffer 150, and the flag circuit 170 is set. Simultaneously the controller 110 outputs the transmission data load/initial number load signal 22 to the down counter 160 so that the initial number m is set to the down counter 160.

If the flag circuit is set to show that the data in the input buffer 150 has not been read by the processor 103, the controller 110 outputs a binary 0 for the ready signal 111 so that the external apparatus 100 is informed that the input of the data is completed.

The processor 103 refers to a status of the flag circuit 170 via the synchronization means 182. If the flag circuit 170 is reset to show no data is in the input buffer 150, the processor 103 does not read data therefrom. If the flag circuit 170 is set to show new data is held in the input buffer, the processor 103 reads the data and resets the flag circuit 170.

The input and output of the data may utilize other devices or methods instead of the flag circuit which reflects the statuses of the input and the output buffers.

Although the present invention has been fully described by way of examples with reference to the accompanying drawings, it is to be noted that various changes and modifications will be apparent to those skilled in the art. These various changes and modifications do not depart from the spirit and scope of the present invention, as set forth in the appended claims.

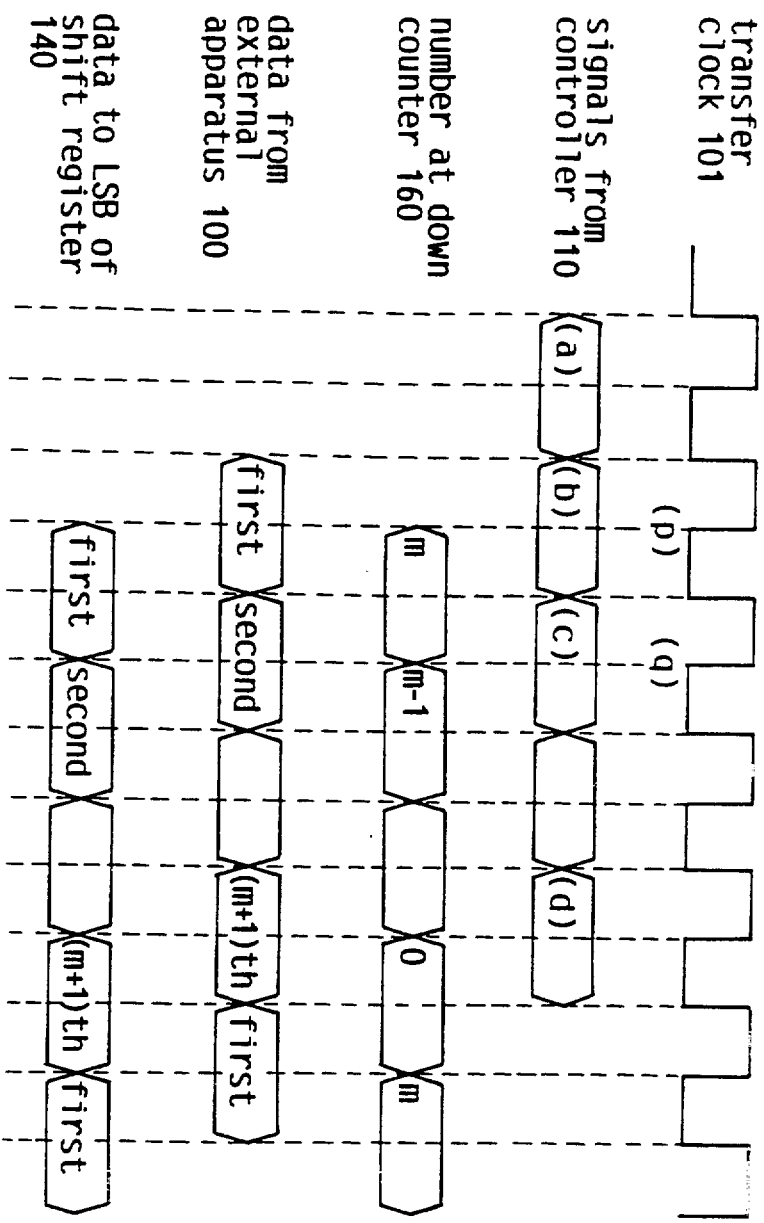

What is claimed:

1. A data input/output control device integrating a one-chip microcomputer together with a data transfer device and a processor, the data transfer device being constructed to transmit and receive serial data from an external apparatus the processor receiving data from the data transfer device and transmitting processed data to the data transfer device, which transmits to the external apparatus, the data input/output control device comprising:

a controller for controlling data input and output of said data transfer device, said controller being supplied with a transfer clock by said external device for use as the clock for said controller, the transfer clock being slower than the clock for said processor;

a flag holding circuit for holding a flag that indicates whether data has been supplied to said data transfer device by either said processor or said external apparatus;

a first synchronization circuit for synchronizing the flag output from said flag holding circuit with the transfer clock, the output from said first synchronization circuit being supplied to said controller; and a second synchronization circuit for synchronizing the flag output from said flag holding circuit with the processor clock, the output from said second synchronization circuit being supplied to said processor, wherein the flag holding circuit is set by either said processor or said controller and is reset by said processor or said controller, whichever one did not set the flag holding circuit.

2. The data input/output control device of claim 1, wherein said data transfer device comprises:

a shift register for converting parallel transmission data from said processor into a serial data bit stream for said external apparatus, and converting serial reception data from said external apparatus into parallel data for said processor;

a reception buffer for temporarily holding the data supplied to said shift register before it is supplied to said processor;

a transmission buffer for temporarily holding the data supplied by said processor before it is supplied to the shift register, wherein said flag holding circuit holds a flag which shows if the transmission buffer holds data when data is to be transmitted, or the reception buffer holds data when data is to be received.

3. The data input/output control device of claim 2, wherein said controller controls said shift register transmitting and receiving serial data from said external apparatus, said controller further comprising:

at the transmission of data, transferring the data in said transmission buffer to said shift register by supplying a shift clock to said shift register so that the serial data is transmitted if the flag in said flag holding circuit shows that said transmission buffer holds data; and at the reception of data, supplying a shift clock to said shift register in order to receive serial data from said external apparatus, transferring the data in said shift register to said reception buffer, and changing the flag in said flag holding circuit to show that reception data is in said reception buffer.

4. The data input/output control device of claim 3, wherein said controller comprises:

a transmission control circuit for generating a load signal to load said shift register with the transmission data when the flag from said flag holding circuit shows that the transmission buffer holds data;

a shift clock output circuit for generating a shift clock for the shift register when the shift register is loaded with the transmission data and when a transfer ready signal is supplied to said external apparatus indicating the reception of the data from said external apparatus; and a reception control circuit for obtaining an indication that reception of data the shift register is complete and changing the flag in said flag holding circuit to show that reception data is held therein.

5. The data input/output control device of claim 4 further comprising a counter for counting the number of bits in the serial data stream to be transferred when the serial data is transferred to the external apparatus, when the serial data is transferred from the external apparatus.

6. An improved one-chip microcomputer comprising a data transfer device for transmitting serial data to and receiving serial data from an external apparatus, a data input/output control device for controlling said data transfer device, and a processor for receiving data from and transmitting data to said external apparatus via said data transfer device, the improvement therein comprising:

a controller for controlling data input and output of said data transfer device, said controller being supplied with a transfer clock by said external device for use as the clock for said controller, the transfer clock being slower than the clock for said processor;

a flag holding circuit for holding a flag that indicates whether data has been supplied to said data transfer device by either said processor or said external apparatus;

a first synchronization circuit for synchronizing the flag output from said flag holding circuit with the transfer clock, the output from said first synchronization circuit being supplied to said controller; and a second synchronization circuit for synchronizing the flag output from said flag holding circuit with the processor clock, the output from said second synchronization circuit being supplied to said processor, wherein the flag holding circuit is set by either said processor or said controller and is reset by said processor or said controller, whichever one previously did not set the said flag holding circuit.

7. The data input/output control device of claim 6, wherein said data transfer device comprises:

a shift register for converting parallel transmission data from said processor into a serial data bit stream for said external apparatus, and converting serial reception data from said external apparatus into parallel data for said processor;

a reception buffer for temporarily holding the data supplied to said shift register before it is supplied to said processor;

a transmission buffer for temporarily holding the data supplied by said processor before it is supplied to the shift register, wherein said flag holding circuit holds a flag which shows if the transmission buffer holds data when data is to be transmitted, or the reception buffer holds data when data is to be received.

8. The data input/output control device of claim 7, wherein said controller controls said shift register transmitting and receiving serial data from said external apparatus, and, said controller further comprising:

at the transmission of data, transferring the data in said transmission buffer to said shift register by supplying a shift clock to said shift register so that the serial data is transmitted if said flag in said flag holding circuit shows that said transmission buffer holds data; and at the reception of data, supplying a shift clock to said shift register so that the serial data from said external apparatus is received, the reception data in said shift register is transferred to said reception buffer, and the flag in said flag holding circuit is changed to show that reception data is in said reception buffer.

9. The data input/output control device of claim 8, wherein said controller comprises:

a transmission control circuit for generating a load signal to load said shift register with transmission data when said flag from the flag holding circuit shows that the transmission buffer holds data;

a shift clock output circuit for generating a shift clock for the shift register when the shift register is loaded with transmission data, as well as outputting the shift clock to the shift register when a transfer ready signal is supplied to said external apparatus indicating the reception of the data from said external apparatus; and a reception control circuit for obtaining an indication that reception of data the shift register is complete and changing the flag in said flag holding circuit to show that reception data is held therein.

10. The data input/output control device of claim 9 further comprising a counter for counting the number of bits in the serial bit data stream when the serial data is transferred to the external apparatus, and when the serial data is transferred from the external apparatus.

* * * * *

UNITED STATES PATENT AND TRADEMARK OFFICE
CERTIFICATE OF CORRECTION

PATENT NO.   : 5,504,927

DATED        : Apr. 2, 1996

INVENTOR(S)  : Minoru Okamoto, et al

It is certified that error appears in the above-identified patent and that said Letters Patent is hereby corrected as shown below:

The drawing sheet, consisting of Fig. 8, should be deleted to be replaced with the drawing sheet consisting of Fig. 8, as shown on the attached page.

Signed and Sealed this

Fifteenth Day of October, 1996

Attest:

BRUCE LEHMAN

*Attesting Officer*          *Commissioner of Patents and Trademarks*